United States Patent [19]
Hurle

[11] 4,086,440
[45] Apr. 25, 1978

[54] TELEPHONE SET WITH LOOP CURRENT INTERRUPTION TIMING CONTROL

[75] Inventor: Robert J. Hurle, Madison, Conn.
[73] Assignee: Chestel, Inc., Chester, Conn.
[21] Appl. No.: 786,847
[22] Filed: Apr. 12, 1977
[51] Int. Cl.² .............................................. H04M 1/00
[52] U.S. Cl. ................................. 179/81 R; 179/84 R
[58] Field of Search ............... 179/81 R, 84 R, 84 A, 179/84 C, 167, 178, 18 BE, 16 H, 18 F, 18 FA

[56] References Cited
U.S. PATENT DOCUMENTS

| 2,653,195 | 9/1953 | Zimmerman | 179/178 |
| 3,384,718 | 5/1968 | Wilder | 179/167 |

Primary Examiner—Kathleen H. Claffy
Assistant Examiner—Joseph A. Popek
Attorney, Agent, or Firm—McCormick, Paulding & Huber

[57] ABSTRACT

In a telephone set, possible mistakes in the generation of "hook flash" and "disconnect" signals, as customarily produced by operation of the hook switch and manifested as interruptions in the loop current, are avoided by a signal generating circuit which produces an accurately timed interruption of loop current, as a hook flash signal, in response to operation of a hook flash push button and which also produces another accurately timed and substantially longer interruption of loop current, as a disconnect signal, in response to operation of the hook switch.

12 Claims, 3 Drawing Figures

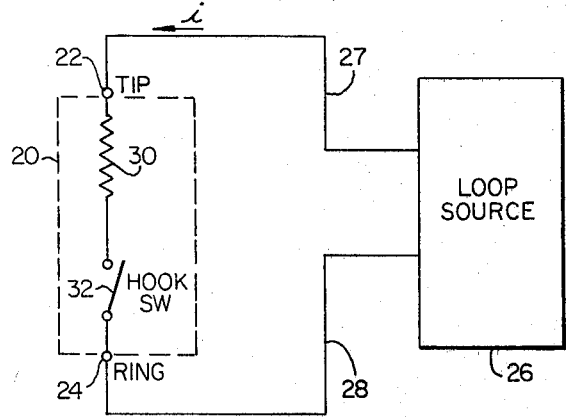
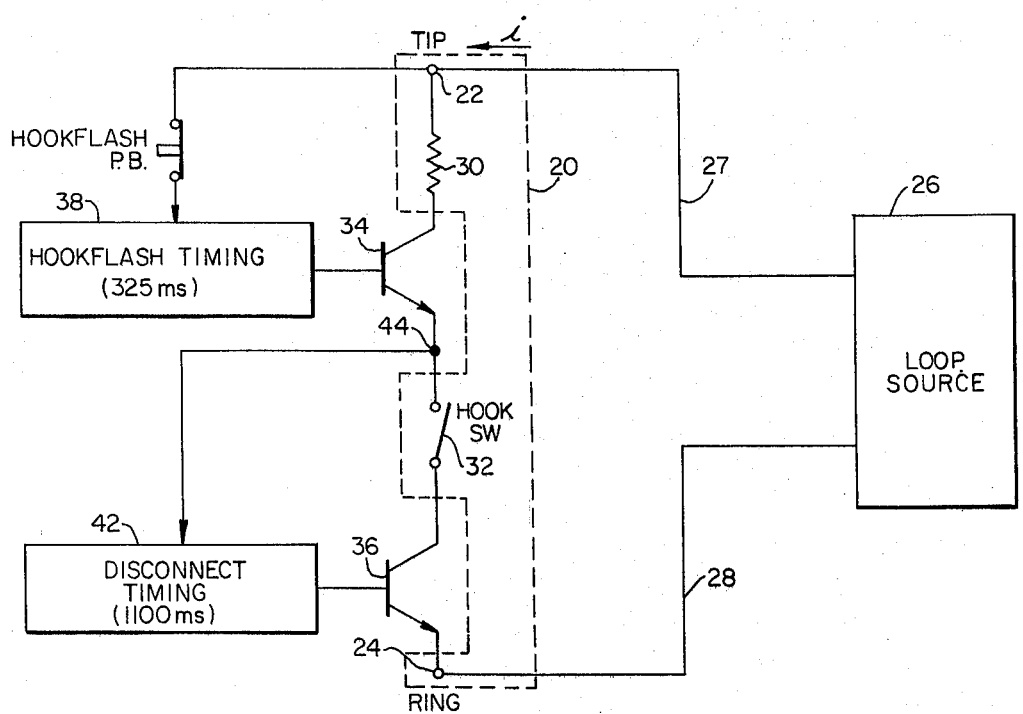

TELEPHONE SET WITH LOOP CURRENT INTERRUPTION TIMING CONTROL

BACKGROUND OF THE INVENTION

This invention relates to automatic telephone systems wherein interruptions in loop current to a telephone set are used as a means of signalling a PBX, a central office or other source from which subscriber loops originate, and deals more particularly with a telephone set having combined with it a signal generating means for selectively producing loop current interruptions of two different time durations to respectively serve as hook flash and disconnect signals.

In telephone systems of the type with which this invention is concerned, a "hook flash" signal is represented by a relatively short term interruption of loop current and a "disconnect" signal is represented by a much longer term interruption of loop current. By way of example, a hook flash may be signified by an interruption of loop current having a duration of anywhere between 250ms to 500ms, and a disconnect signal may be signified by an interruption of loop current for an interval of greater than 500ms. Perhaps most commonly, the hook flash signal is used to signal the equipment at the loop source that the user of the telephone in question desires to place a call on hold, and the disconnect signal is used to signal that the user desires to be disconnected from the current call. In past systems, hook flash and disconnect signals have been generated by manual operation of the hook switch, but it is difficult for human beings to reproduce consistently properly timed switch operations and mistakes are often made.

A general object of this invention is therefore to avoid the problem of mistakes in generating hook flash and disconnect signals by manual operation of the hook switch of a telephone set. In keeping with this object, a further and more specific object is to provide a signal generating circuit for use with a telephone set, which circuit in response to manual inputs by a user produces accurately timed and unambiguous hook flash and/or disconnect signals.

In particular, an object of this invention is to provide a signal generating circuit as set out above including a hook flash push button, a means whereby upon manual operation of the hook flash push button, an accurately timed hook flash interruption of loop current is obtained, and a means whereby upon operation of the hook switch another longer accurately timed interruption of loop current is obtained to represent a disconnect signal.

Another object of the invention is to provide a loop current interruption signalling circuit for a telephone wherein operation of a given push button always produces a "hook flash" signal and operation of the hook switch always produces a "disconnect" signal regardless of how long the push button or hook switch may be held depressed by the user.

Other objects and advantages of this invention will be apparent from the following detailed description of a preferred embodiment and from the accompanying drawings.

SUMMARY OF THE INVENTION

The invention resides in a telephone loop circuit for use in a telephone system wherein interruptions in loop current are used to represent signals to the loop source equipment. This loop circuit, in addition to a telephone set having an equivalent network resistance and a hook switch having at least one set of contacts further includes a tip terminal, a ring terminal and a series electrical circuit between the tip terminal and the ring terminal which includes the set of contacts of the hook switch and the equivalent resistance of the telephone set in series with one another. In addition to this series circuit being interruptible by the opening of the contacts of the hook switch, it also includes at least one other normally conducting switch means which is controlled to interrupt the series circuit for accurately timed intervals. Such time interval may be generated by operation of a hook flash push button or by operation of the hook switch.

The invention further resides in the series circuit interrupting means including two electronic switch elements each responsive to a control pulse produced by an associated timing circuit for accurately timing the interruption of the loop current, one timing circuit being a hook flash timing circuit for producing a control pulse of a first predetermined duration in response to operation of a hook flash push button and the other timing circuit being a disconnect timing circuit for producing a control pulse of a second longer predetermined time interval in response to operation of the hook switch.

BRIEF DESCRIPTION OF THE DRAWINGS

FIG. 1 is a schematic diagram showing a prior art loop circuit.

FIG. 2 is a schematic diagram showing in block diagram form a loop circuit embodying this invention.

DETAILED DESCRIPTION OF THE PREFERRED EMBODIMENT

Figure 3:
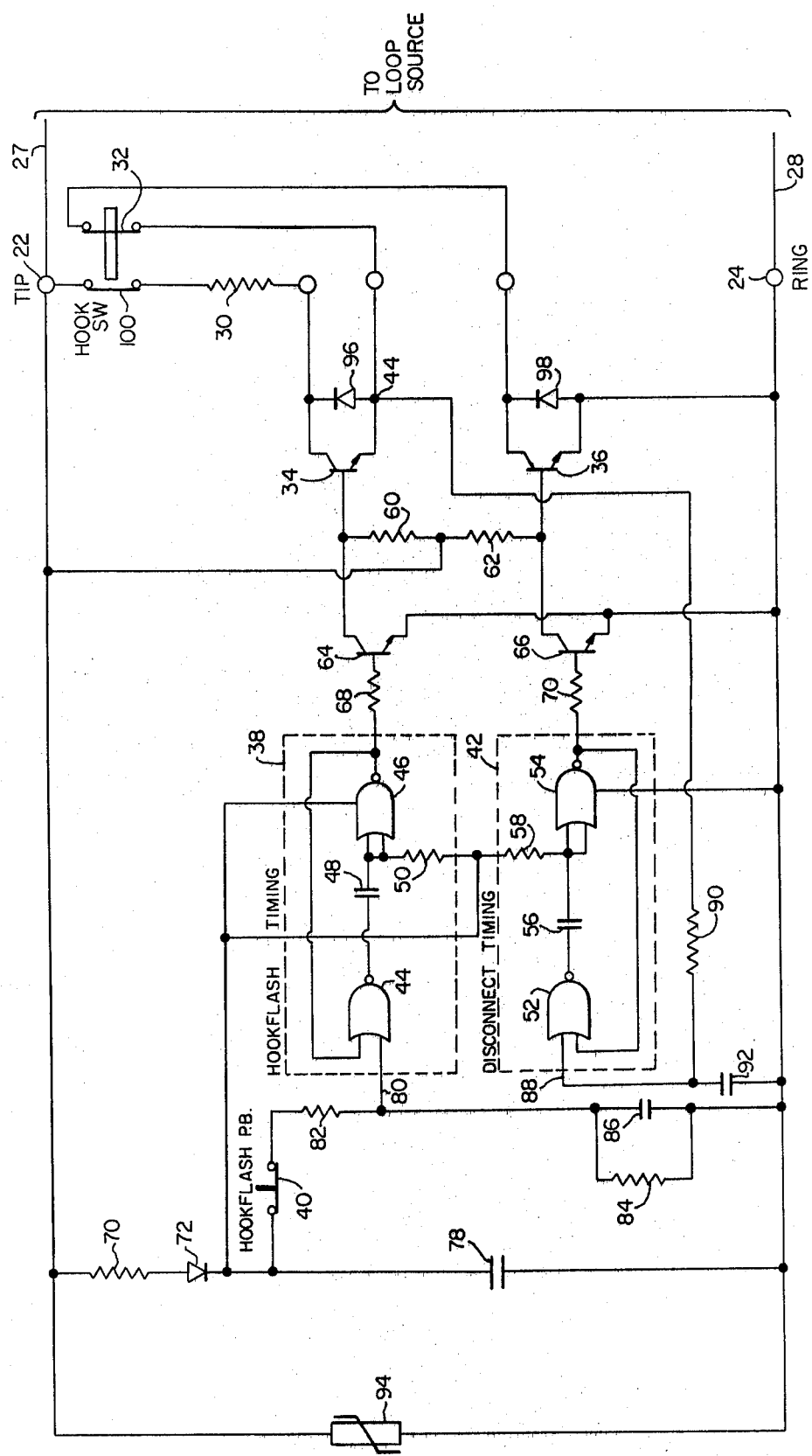
FIG. 3 is a schematic diagram showing in more detail the loop circuit of FIG. 2.

Referring first to FIG. 1, this figure shows, for purposes of explanation, a prior art telephone loop circuit comprising a telephone 20, having tip and ring terminals 22 and 24, connected to a loop source 26 by means of a pair of parallel loop conductors 27 and 28. The telephone 20 has a network with an equivalent resistance 30 and also includes a hook switch with at least one set of contacts 32. The telephone network, as represented by its equivalent resistance 30, and the hook switch contacts 32 are connected in series with one another between the tip and ring terminals. The contacts 32 are open when the telephone is on-hook and closed when the telephone is off-hook. The loop source 26 provides a DC voltage across the conductors 27 and 28 and therefore when the telephone 20 is off-hook (with contacts 32 closed) a loop current $i$ flows through the loop.

In many automatic telephone systems, it is conventional to signal the loop source 26 by operating the hook switch contacts 32 to interrupt the loop current $i$ while the telephone is off-hook. Further, it is conventional to have two such loop current interruption signals — one being a short term interruption referred to as a "hook flash" signal and the other being a longer term interruption referred to as a "disconnect" signal. The hook flash signal is usually produced by manually operating the hook switch contacts 32 and the disconnect signal is usually produced by either manually operating the hook switch contacts 32 or by placing the hand piece of the telephone set back on-hook which also operates the hook switch contacts 32. The durations of the interruptions used to represent hook flash or disconnect signals may vary from system to system, but by way of example, in a typical system a hook flash may be represented by an interruption of loop cirrent of from anywhere between 250ms to 500ms and a disconnect signal may be represented by an interruption of loop current greater than 500ms.

FIG. 2 represents a system embodying this invention and wherein means are provided for achieving accurately timed loop current interruptions to avoid mistakes in manual interruption timing as is readily possible with a system such as that of FIG. 1. Referring to FIG. 2, the system disclosed thereby, in addition to the loop source 26, loop conductors 27, 28 and telephone set 20, includes a signal generating circuit having two electronic switch elements in the form of transistors 34 and 36. These transistors are connected, as shown, in a series circuit between the tip and ring terminals 22 and 24 with such series circuit also including the network equivalent resistance 30 and the hook switch set of contacts 32. The two transistors 34 and 36 are normally conducting. Associated with the transistor 34 is a hook flash timing circuit 38 which in response to operation of a hook flash push button 40 produces an output electrical pulse, of predetermined duration, for example 325ms, which during its appearance turns off the transistor 34. Likewise, the transistor 36 has associated therewith a disconnect timing circuit 42 which is responsive to changes in voltage at a node point 44 of the aforementioned series circuit to produce an output electrical pulse of predetermined duration, for example 1100ms, which during its appearance turns off the transistor 36. Changes in voltage at the node point 44, it will be understood, are caused by opening and closing of the hook switch contacts 32. The disconnect timing circuit 42 in turn is responsive to initiate a timing pulse when the change of voltage at the node 44 corresponds to that obtained from moving of the contacts 32 from closed to open condition. That is, in the illustrated case, the tip terminal voltage is more positive than the ring terminal voltage, and the disconnect timing circuit initiates a timing pulse when the voltage at node 44 rises from a value close to ring terminal voltage toward tip terminal voltage.

From the above description of the FIG. 2 circuit, it will be understood that when the hook flash push button 40 is operated, the hook flash timing circuit 38 produces a timing pulse which turns off the transistor 34 for a predetermined time (325ms), thereby interrupting the loop current *i* for such predetermined time as a signal representing a hook flash to the loop source 26. Likewise, when the hook switch contacts 32 are moved from a closed to an open position, the disconnect timing circuit 42 produces a longer duration timing pulse which turns off the transistor 36 to interrupt the loop current *i* for such longer predetermined time (1100ms) to represent a disconnect signal to the loop source 26.

The general circuit shown in FIG. 2 may be implemented in various different ways, but FIG. 3, by way of example, shows one specific circuit arrangement which may be utilized. Referring to this figure, the two timing circuits 38 and 42 are one shot multi-vibrator circuits each built from two NOR gates and an R-C timing circuit. In the hook flash timing circuit 38, the NOR gates are shown at 44 and 46, the timing capacitor at 48 and the timing resistor at 50. In the disconnect timing circuit 42, the NOR gates are shown at 52 and 54, the timing capacitor at 56 and the timing resistor at 58. The two transistors 34 and 36 have their emitter and collector terminals connected in the tip to ring series circuit and they are normally biased to their conducting states by tip terminal voltage supplied to their base terminals through resistors 60 and 62 respectively. Connected with the base of the transistor 38 is a normally non-conducting shunt transistor 64 which when conducting shunts the base to the ring terminal voltage to turn off the transistor 34. Likewise, connected to the base of the transistor 36 is a similar normally non-conducting shunt transistor 66. The base of the shunt transistor 64 is connected to the output of the hook flash timing circuit 38 through an isolating resistor 68 and the base of the shunt transistor 66 is connected to the disconnect timing circuit 42 through an isolating resistor 70. The timing pulses produced by the circuits 38 and 42 are positive pulses which during their appearance turn on the associated shunt transistor 64 or 66 to in turn turn off the associated switching transistor 34 or 36.

Operating power is supplied to the two timing circuits 38 and 42 through a resistor 70, diode 72 and lines 74 and 76, the four NOR gates 44, 46, 52 and 54 being part of a single integrated circuit component. A voltage close to tip terminal voltage is taken as logical "1" and ring terminal voltage as logical "0". A filter 78 filters the power supplied to the timing circuits to remove any AC components, and the resistor 70 has a relatively large value so that no undue loading of the loop circuit will occur.

The hook flash push button 40 is connected to the input terminal 80 of the hook flash timing circuit 38 through a resistor 82 which in conjunction with resistor 84 and capacitor 86 serve to remove effects of contact bounce to provide a reliable triggering signal at the input terminal 80 when the hook push button is operated. The resistance of resistor 84 is substantially larger than the combined value of resistors 70 and 82 so that when the push button 40 is closed the voltage at terminal 80 is at or above the logical "1" level. The hook flash timing circuit 38 operates to initiate a timing pulse in response to the voltage at the terminal 80 going from a logical "0" to a logical "1". More particularly, with the hook flash push button closed, as shown in FIG. 3, the input terminal 80 is held at a logical "1" value. When the push button 40 is opened, the voltage at terminal 80 drops to a logical "0" value, but this has no effect on the timing circuit 38. When the push button 40 is next released, the input voltage at the terminal 80 rises from logical "0" to logical "1" and this initiates a positive voltage timing pulse, supplied to the resistor 68, the duration of which is determined by the capacitor 48 and resistor 50.

The disconnect timing circuit 42 is also triggered by a rise in voltage, from a logical "0" value toward a logical "1" value, applied to its input terminal 88. This signal is supplied from the node 44 when the hook switch contacts 32 open, the resistor 90 and capacitor 92 serving to remove the effects of contact bounce. That is, when the switch 32 opens the signal on the input terminal 88 changes from logical "0" to logical "1" triggering the disconnect timing circuit which produces a positive voltage timing pulse supplied to the resistor 70 the duration of which is determined by the capacitor 56 and resistor 58.

With further reference to FIG. 3, a varistor 94 is connected across the tip and ring terminals and diodes 96 and 98 are connected across the transistors 34 and 36 to protect the illustrated circuit from undue voltage transients as might be caused by inductive surges in the coil of the telephone set network or by static electricity discharges. Also, in the illustrated circuit, the hook switch of the telephone set includes a second set of normally closed contacts 100 which are also connected in the series circuit between the tip and ring terminals as shown. When the hook switch is shifted from off-hook to on-hook condition, the contacts 32 break before the contacts 100. Conversely, when the hook switch is shifted from on-hook to off-hook condition, the contacts 100 make before the contacts 32. Therefore, with the contacts 32 and 100 positioned as shown in FIG. 3, when the hook switch is shifted to on-hook position, during the interval between the opening of the contacts 32 and the opening of the contacts 100 tip voltage will be supplied to the input terminal 88 of the disconnect timing circuit to initiate a disconnect timing pulse before the contacts 100 are opened to remove tip voltage from the node 44. Opening of the contacts 100 thereafter removes tip voltage entirely from the telephone network.

I claim

1. The combination comprising a telephone set having an equivalent network resistance and a hook switch including at least one set of contacts which is open when said telephone set is in an on-hook condition and which is closed when said telephone set is in an off-hook condition, said telephone set also having tip and ring terminals for connecting it to a loop circuit, a hook flash push button, a series electrical circuit between said tip terminal and said ring terminal which series circuit includes said set of contacts of said hook switch and said equivalent resistance of said telephone set in series with one another, means responsive to operation of said hook flash push button for opening said series circuit for a time interval of a first predetermined duration, and means responsive to opening of said one set of contacts of said hook switch for opening said series circuit between said tip terminal and said ring terminal, at a place other than that of said one set of contacts, for a time interval of a second predetermined duration.

2. The combination defined in claim 1 wherein said second predetermined duration is substantially greater than said first predetermined duration.

3. The combination defined in claim 1 further characterized by said means for opening said series circuit in response to operation of said push button including a normally conducting electronic switch element in said series circuit and a hook flash timing circuit connected with said electronic switch element, said hook flash timing circuit in response to operation of said push button being operable to generate an electrical pulse of said first predetermined duration which pulse is supplied to said electronic switch element and turns off said switch element during its appearance.

4. The combination defined in claim 1 further characterized by said means for opening said series circuit in response to opening of said one set of contacts of said hook switch comprising a normally conducting electronic switch element in said series circuit and a disconnect timing circuit connected with said electronic switch element, said disconnect timing circuit in response to opening of said set of contacts being operable to generate an electrical pulse of said second predetermined duration which pulse is supplied to said electronic switch element and turns off said electronic switch element during its appearance.

5. The combination defined in claim 1 further characterized by said means for opening said series circuit in response to operation of said push button including a first normally conducting electronic switch element in said series circuit and a hook flash timing circuit connected with said first electronic switch element, said hook flash timing circuit in response to operation of said push button being operable to generate an electrical pulse of said first predetermined duration which pulse is supplied to said first electronic switch element and turns off said switch element during its appearance, said means for opening said series circuit in response to opening of said one set of contacts of said hook switch comprising a second normally conducting electronic switch element in said series circuit and a disconnect timing circuit connected with said second electronic switching element, said disconnect timing circuit in response to opening of said one set of contacts being operable to generate an electrical pulse of said second predetermined duration which pulse is supplied to said second electronic switch element and turns off said second electronic switch element during its appearance.

6. The combination defined in claim 5 further characterized by said first and second electronic switch elements being first and second transistors respectively each having its collector and emitter terminals connected in said series circuit, means electrically connecting the base of each of said first and second transistors to one of said tip and ring terminals through a resistor so as to bias said transistor to a conducting state, two shunt transistors each connected between the base of one of said first and second transistors and the other of said tip and ring terminals, each of said shunt transistors being normally non-conducting and being biased to a conducting state by an associated one of said electrical pulses.

7. The combination defined in claim 6 further characterized by each of said timing circuits being a one shot multi-vibrator circuit, and circuit means connecting said one shot multi-vibrator to said tip and ring terminals so as to be powered by the voltage appearing across said tip and ring terminals.

8. The combination comprising a telephone set having an equivalent network resistance and a hook switch including at least one set of contacts which is open when said telephone is in an on-hook condition and which is closed when said telephone set is in an off-hook condition, said telephone set also having tip and ring terminals for connecting said telephone set in a loop circuit, a hook flash push button, a series electrical circuit between said tip terminal and said ring terminal which series circuit includes said set of contacts of said hook switch and said equivalent resistance of said telephone set in series with one another, and means responsive to operation of said hook flash push button for opening said series circuit for a time interval of predetermined duration.

9. The combination defined in claim 8 further characterized by said means for opening said series circuit in response to operation of said push button including a normally conducting electronic switch in said series circuit and a hook flash timing circuit connected with said electronic switch element, said hook flash timing circuit in response to operation of said push button being operable to generate an electrical control pulse of said predetermined duration which control pulse is supplied to said electronic switch element and turns off said switch element during its appearance.

10. The combination comprising a telephone set having an equivalent network resistance and a hook switch including at least one set of contacts which is open when said telephone is in an on-hook condition and which is closed when said telephone set is in an off-hook condition, a tip terminal, a ring terminal, a series electrical circuit between said tip terminal and said ring terminal which series circuit includes said set of contacts of said hook switch and said equivalent resistance of said telephone set in series with one another, and means responsive to opening of said one set of contacts of said hook switch for opening said series circuit between said tip terminal and said ring terminal, at a place other than that of said one set of contacts, for a time interval of predetermined duration.

11. The combination defined in claim 10 further characterized by said means for opening said series circuit in response to opening of said one set of contacts of said hook switch comprising a normally conducting electronic switch element in said series circuit and a timing circuit connected with said electronic switch element, said timing circuit in response to opening of said set of contacts being operable to generate an electrical pulse of said predetermined duration which pulse is supplied to said electronic switch element and turns off said electronic switch element during its appearance.

12. The combination comprising a telephone set having an equivalent network resistance and a hook switch including at least one set of contacts which is open when said telephone set is in an on-hook condition and which is closed when said telephone set is in an off-hook condition, said telephone set also having tip and ring terminals for connecting it to a loop circuit, two electronic switch elements, a series electrical circuit between said tip terminal and said ring terminal which series circuit includes an intermediate node point, said series circuit having said equivalent resistance and said first electronic switch element connected in series with one another between said tip terminal and said node point and said series circuit having said one set of contacts of said hook switch and said second electronic switch element connected in series with one another between said node point and said ring terminal, biasing means connected between each of said electronic switch elements and one of said tip and ring terminals for supplying biasing voltage to said elements to bias said elements to normally conducting conditions, a first one-shot multi-vibrator circuit responsive to an input signal for producing an output timing pulse having a predetermined duration, means responsive to said first timing pulse for shunting the biasing voltage from said first electronic switch element to thereby turn said first electronic switch element to a non-conducting state during its appearance, a second one-shot multi-vibrator circuit responsive to an input signal for producing a second timing pulse of predetermined duration, means responsive to said second timing pulse for shunting the biasing voltage from said second electronic switch element to thereby turn said second electronic switch element to a non-conducting state during the appearance of said second timing pulse, means connecting both of said one-shot multi-vibrators to said tip and ring terminals so as to power them from the voltage appearing across said tip and ring terminals, a circuit connected from the input terminal of said first one-shot multi-vibrator to said tip terminal and including a hook flash push button for producing a trigger signal initiating operation of said first one-shot multi-vibrator in response to operation of said push button, and a circuit connected from the input of said second one-shot multi-vibrator to said node point so as to produce a trigger signal initiating operation of said second one-shot multi-vibrator in response to voltage changes appearing at said node due to operation of said one set of contacts of said hook switch.

* * * * *